US007361085B2

(12) United States Patent
Packes, Jr. et al.

(10) Patent No.: US 7,361,085 B2
(45) Date of Patent: Apr. 22, 2008

(54) DEVICE AND METHOD FOR PROVIDING PAYOUTS BASED ON ACTIVITY AND RANKS OF OTHER GAMING SESSIONS

(75) Inventors: John M. Packes, Jr., Hawthorne, NY (US); James A. Jorasch, Stamford, CT (US); Jay S. Walker, Ridgefield, CT (US); Michael D. Downs, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 307 days.

(21) Appl. No.: 09/991,168

(22) Filed: Nov. 14, 2001

(65) Prior Publication Data

US 2002/0065123 A1 May 30, 2002

Related U.S. Application Data

(63) Continuation-in-part of application No. 09/223,902, filed on Dec. 31, 1998, now Pat. No. 6,319,122.

(51) Int. Cl.
*A63F 5/00* (2006.01)
*A63F 13/00* (2006.01)

(52) U.S. Cl. ............................ 463/16; 463/20; 463/25

(58) Field of Classification Search .................. 463/16, 463/20, 25–27, 1, 24; 273/143 R, 138.1
See application file for complete search history.

(56) References Cited

U.S. PATENT DOCUMENTS 5,046,736 A * 9/1991 Bridgeman et al. ........... 463/13
5,078,405 A 1/1992 Jones et al. ................. 273/309
5,116,055 A 5/1992 Tracy ..................... 273/138 A
5,129,652 A 7/1992 Wilkinson .................. 273/139
5,280,909 A 1/1994 Tracy ..................... 273/138 A
5,518,253 A 5/1996 Pocock et al. .............. 273/439
5,537,314 A 7/1996 Kanter ...................... 364/406
5,564,700 A 10/1996 Celona ........................ 463/27
5,580,309 A 12/1996 Piechowiak et al. .......... 463/16
5,613,912 A * 3/1997 Slater .......................... 463/25
5,639,088 A 6/1997 Schneider et al. ....... 273/138.2
5,683,082 A 11/1997 Takemoto et al. ...... 273/121 B
5,758,875 A 6/1998 Giacalone, Jr. ......... 273/143 R
5,768,382 A * 6/1998 Schneier et al. ............ 713/251
5,795,225 A 8/1998 Jones et al. .................... 463/13
5,800,264 A 9/1998 Pascal et al. ................. 463/16
5,816,918 A 10/1998 Kelly et al. .................... 463/16
5,820,459 A 10/1998 Acres et al. .................. 463/25
5,836,817 A 11/1998 Acres et al. .................. 463/26
5,876,284 A 3/1999 Acres et al. .................. 463/25

(Continued)

OTHER PUBLICATIONS

"Acres Gaming To Install Bonusing At Treasure Island Resort . . . ", PR NewsWire, Aug. 1, 1995, Financial News Section.

(Continued)

*Primary Examiner*—Robert E. Pezzuto
*Assistant Examiner*—Omkar A. Deodhar

(57) ABSTRACT

One embodiment of the present invention provides for determining a first gaming session; determining a rank of the first gaming session; determining at least one gaming session, each at least one gaming session of the first set having a respective rank that is not higher than the rank of the first gaming session, determining data corresponding to the at least one gaming session; determining at least one bonus based on the data; and applying the at least one bonus to the first gaming session.

46 Claims, 12 Drawing Sheets

U.S. PATENT DOCUMENTS

| | | | | |
|---|---|---|---|---|
| 5,910,048 | A | 6/1999 | Feinberg | 463/25 |
| 5,970,143 | A * | 10/1999 | Schneier et al. | 713/181 |
| 6,077,162 | A | 6/2000 | Weiss | 463/26 |
| 6,077,163 | A | 6/2000 | Walker et al. | 463/26 |
| 6,142,872 | A | 11/2000 | Walker et al. | 463/16 |
| 6,146,273 | A | 11/2000 | Olsen | 463/27 |
| 6,165,071 | A * | 12/2000 | Weiss | 463/24 |
| 6,511,377 | B1 * | 1/2003 | Weiss | 463/25 |
| 2004/0077408 | A1 * | 4/2004 | D'Amico et al. | 463/42 |

OTHER PUBLICATIONS

"Acres Gaming Announces Licensing of its Proprietary Bonusing Protocol", Acres Gaming, May 18, 1998, (http //www acresgaming com/news/05-18-98 html).

Mayes, Steve, "One-Armed Bandits Sire New Breeds", Oregonian, May 31, 1998, p. C.01.

"Acres Gaming Releases Its First Bonus Game", Acres Gaming Inc., Jun. 30, 1998, (http //www acresgaming com/news/06-30-98 html).

Parets, Robyn Taylor, "'Random' development", International Gaming and Wagering Business, Sep. 1998, p. 40, ISSN: 8750-8222.

"Mikohn's CasinoLink Named One of Gaming's Most Innovative New Products For 1999; Only Slot Management System To Be Honored", PR NewWire, Oct. 7, 1998, Financial News Section.

Grochowski, John, "Slot club bonuses add up", Chicago Sun-Times, Oct. 18, 1998, Section: SHO; CASINOS; p. 15; NC.

U.S. Examiner's Office Action dated Feb. 8, 2001, U.S. Appl. No. 09/223,902, Filing Date Dec. 31, 1998, 3 pp.

U.S. Examiner's Office Action dated May 23, 2001, U.S. Appl. No. 09/223,902, Filing Date Dec. 31, 1998, 3 pp.

* cited by examiner

114

| OUTCOME 202 | DEFAULT PAYOUT 204 | BONUS PAYOUT 206 |
|---|---|---|
| NONWINNING COMBINATION | 0 | 0 |
| CHERRY / ANY / ANY | 2 | 0 |
| ANY / ANY / CHERRY | 2 | 0 |
| CHERRY / CHERRY / ANY | 5 | 0 |
| ANY / CHERRY / CHERRY | 5 | 0 |
| CHERRY / ANY / CHERRY | 5 | 0 |
| CHERRY / CHERRY / CHERRY | 20 | 0 |
| BAR / ORANGE / ORANGE | 10 | 0 |
| ORANGE / ORANGE / BAR | 10 | 0 |
| ORANGE / ORANGE / ORANGE | 20 | 0 |
| BAR / PLUM / PLUM | 14 | 0 |
| PLUM / PLUM / BAR | 14 | 0 |
| PLUM / PLUM / PLUM | 20 | 0 |
| BAR / BELL / BELL | 18 | 0 |
| BELL / BELL / BAR | 18 | 0 |
| BELL / BELL / BELL | 20 | 2 |
| BAR / BAR / BAR | 50 | 5 |
| 7 / 7 / 7 | 100 | 10 |

208

FIG. 4

116

| OUTCOME 214 | DEFAULT | | BONUS | |
|---|---|---|---|---|
| | RANDOM NUMBER 216 | EXPECTED HITS PER CYCLE 218 | RANDOM NUMBER 220 | EXPECTED HITS PER CYCLE 222 |
| NONWINNING COMBINATION | 1-8570 | 8570 | 1-8566 | 8566 |
| CHERRY / ANY / ANY | 8571-9250 | 680 | 8567-9246 | 680 |
| ANY / ANY / CHERRY | 9251-9930 | 680 | 9247-9926 | 680 |
| CHERRY / CHERRY / ANY | 9931-10130 | 200 | 9927-10126 | 200 |
| ANY / CHERRY / CHERRY | 10131-10330 | 200 | 10127-10326 | 200 |
| CHERRY / ANY / CHERRY | 10331-10398 | 68 | 10327-10394 | 68 |
| CHERRY / CHERRY / CHERRY | 10399-10418 | 20 | 10395-10414 | 20 |
| BAR / ORANGE / ORANGE | 10419-10460 | 42 | 10415-10456 | 42 |
| ORANGE / ORANGE / BAR | 10461-10466 | 6 | 10457-10462 | 6 |
| ORANGE / ORANGE / ORANGE | 10467-10508 | 42 | 10463-10504 | 42 |
| BAR / PLUM / PLUM | 10509-10528 | 20 | 10505-10524 | 20 |
| PLUM / PLUM / BAR | 10529-10533 | 5 | 10525-10529 | 5 |
| PLUM / PLUM / PLUM | 10534-10583 | 50 | 10530-10579 | 50 |
| BAR / BELL / BELL | 10584-10587 | 4 | 10580-10583 | 4 |
| BELL / BELL / BAR | 10588-10607 | 20 | 10584-10604 | 21 |
| BELL / BELL / BELL | 10608-10627 | 20 | 10605-10625 | 21 |
| BAR / BAR / BAR | 10628-10647 | 20 | 10626-10646 | 21 |
| 7 / 7 / 7 | 10648 | 1 | 10647-10648 | 2 |

224

225

FIG. 5

240

| PLAYER IDENTIFIER 242 | NAME 244 | ADDRESS 246 | CREDIT CARD INFORMATION 248 | COMP. POINTS 250 | BONUS ACCOUNT BALANCE 252 | TEAM IDENTIFIER 254 | PLAYER RANK 256 |
|---|---|---|---|---|---|---|---|
| 123456 | BILL SMITH | 10 MAIN ST. TOWN, USA | 1111-1111-1111-1111 | 500 | $100.00 | | N/A |
| 127300 | JOE BROWN | 15 RIVER RD. VILLAGE, USA | 2222-2222-2222-2222 | 2,000 | $50.00 | | 13 |
| 119564 | DAVE GREENE | 4567 PARK AVE. CITY, USA | 2468-1012-1416-1820 | 3,800 | $25.00 | | 21 |

260

FIG. 6

270

| CURRENT MACHINE RANKING 272 | MACHINE IDENTIFIER 274 | PLAYER IDENTIFIER 276 | PLAYER START TIME 278 | PLAYER STOP TIME 280 |
|---|---|---|---|---|
| N/A | 26925 | 123456 | 06:35 AM | 07:05 AM |
| N/A | 26863 | 124985 | 06:36 AM | 06:42 AM |
| N/A | 27524 | 136243 | 06:38 AM | 07:25 AM |
| N/A | 19086 | 148925 | 06:42 AM | 07:10 AM |
| 1 | 26324 | 119644 | 06:46 AM | STILL PLAYING |
| 2 | 25998 | 123941 | 06:55 AM | STILL PLAYING |
| 3 | 28463 | 106824 | 06:59 AM | STILL PLAYING |
| N/A | 23222 | 102933 | 07:05 AM | 07:15 AM |
| 4 | 21009 | 142663 | 07:08 AM | STILL PLAYING |
| 5 | 20056 | 130925 | 07:09 AM | STILL PLAYING |
| N/A | 27984 | 121866 | 07:15 AM | 07:22 AM |
| 6 | 26306 | 122902 | 07:18 AM | STILL PLAYING |
| 7 | 25511 | 133689 | 07:22 AM | STILL PLAYING |
| 8 | 28623 | 134025 | 07:25 AM | STILL PLAYING |
| 9 | 17756 | 104621 | 07:29 AM | STILL PLAYING |
| 10 | 16905 | 117752 | 07:36 AM | STILL PLAYING |
| 11 | 19634 | 116084 | 07:38 AM | STILL PLAYING |
| 12 | 19592 | 126444 | 07:39 AM | STILL PLAYING |
| 13 | 23513 | 127300 | 07:42 AM | STILL PLAYING |
| 14 | 22871 | 152808 | 07:44 AM | STILL PLAYING |
| 15 | 21404 | 150327 | 07:48 AM | STILL PLAYING |
| 16 | 24688 | 122491 | 07:53 AM | STILL PLAYING |

282

284

FIG. 7

DEVICE AND METHOD FOR PROVIDING PAYOUTS BASED ON ACTIVITY AND RANKS OF OTHER GAMING SESSIONS

CROSS-REFERENCE TO RELATED APPLICATIONS

The present application is a continuation-in-part of U.S. patent application Ser. No. 09/223,902, "ELECTRONIC AMUSEMENT DEVICE AND METHOD FOR PROVIDING PAYOUTS BASED ON THE ACTIVITY OF OTHER DEVICES," filed Dec. 31, 1998 now U.S. Pat. No. 6,319,122, which is incorporated herein by reference.

BACKGROUND OF THE INVENTION

1. Field of the Invention

The present invention relates to electronic gaming devices, and more specifically to electronic gaming devices which adjust payout amounts based on the activity and ranks of other gaming sessions.

2. Description of the Related Art

The profitability of slot machines is directly proportional to the amount of time that they are played. Consequently, casinos often attempt to prolong the length of player gambling sessions. Casino slot clubs were developed with just such a goal in mind. Players were provided reward points for each dollar wagered, with points exchangeable for cash, merchandise, food, etc. Much like an airline frequent flyer mile system, slot clubs encouraged greater play since the player would earn larger reward point totals. Although these programs succeeded in providing an incentive to play more, players had no incentive to extend the length of a given gambling session since they could always pick up where they left off at a later session. Three sessions of one hour each were thus equivalent to one session of three hours. Every time that a player ended a gambling session, however, there was a risk that he would go to another casino. Casinos would prefer that a player play for extended periods of time rather than over multiple sessions.

SUMMARY OF THE INVENTION

One embodiment of the present invention provides for determining a first gaming session; determining a rank of the first gaming session; determining at least one gaming session, each at least one gaming session of the first set having a respective rank that is not higher than the rank of the first gaming session, determining data corresponding to the at least one gaming session; determining at least one bonus based on the data; and applying the at least one bonus to the first gaming session.

BRIEF DESCRIPTION OF THE DRAWINGS

These and other objects, features and advantages of the invention will be understood from a consideration of the following description of the invention, in which:

FIG. 4 is a table showing components of the payout table of FIG. 2;

FIG. 5 is a table showing components of the probability table of FIG. 2;

FIG. 6 is a table showing components of the player table of FIG. 3;

FIG. 7 is a table showing components of the gaming session table of FIG. 3;

DETAILED DESCRIPTION

Figure 1:
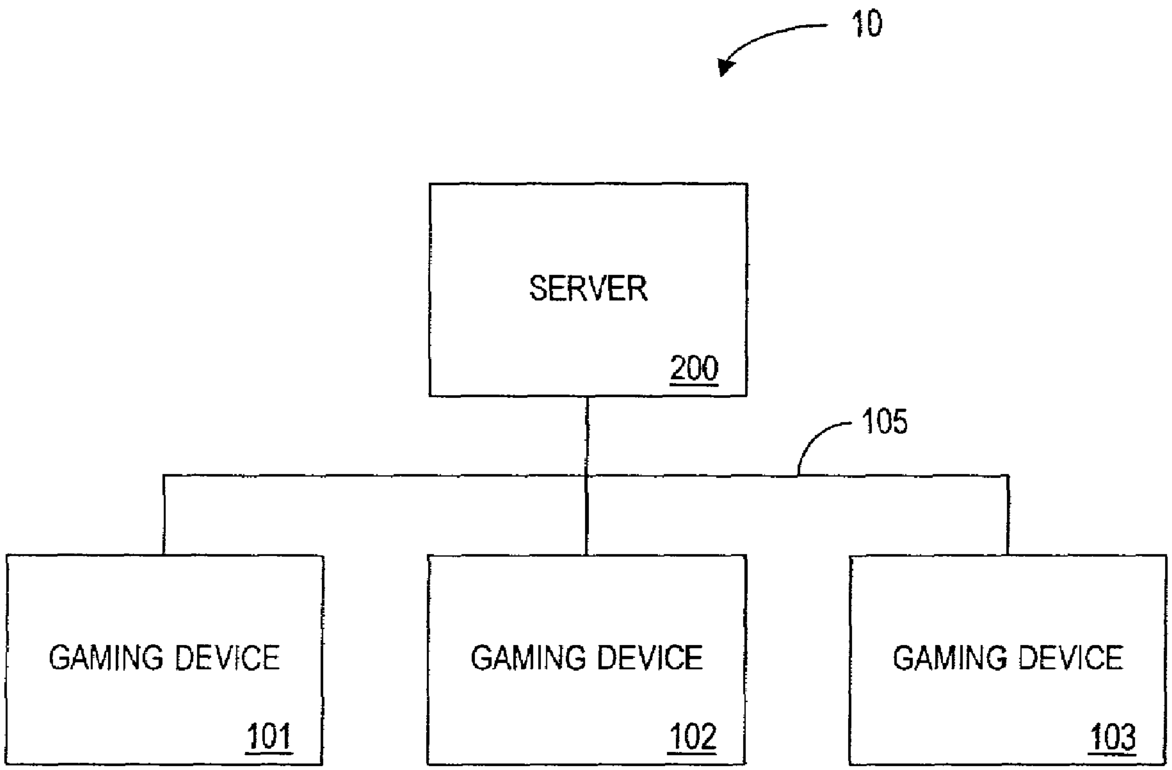
FIG. 1 is a block diagram illustrating a system for implementing the present invention.

An object of the present invention is to provide a method and apparatus enabling slot machine players to easily determine whether a slot machine is desirable. A further object of the present invention is to provide a slot machine that adjusts its performance based in part upon the performance of at least one other slot machine. An advantage of the present invention for a casino operator is that it attracts the attention of potential slot machine players. Another advantage of the present invention for a casino operator is that it encourages prolonged slot machine play by players using the device.

In accordance with various embodiments of the present invention, an electronic amusement device and method is disclosed for rewarding a player of a game based on the activity of other players. The method includes the step of determining the initiation of a player gaming session in which at least one play has been concluded. Such a play might include the conclusion of the spin of the reels of a slot machine, or the completion of a hand of video poker. The method also includes the step of determining subsequent gaming sessions in which each of these sessions is initiated after the initiation of the player gaming session. Payouts are determined for each of these subsequent gaming sessions and a bonus is determined based on at least one of these payouts, the bonus being applied to the player gaming session. The disclosed slot machine implements the method of the present invention.

In accordance with various embodiments of the present invention, a slot server and method is disclosed for communicating an indication of adjusted performance between at least two slot machines.

In accordance with various embodiments of the present invention, an electronic amusement device and method is disclosed for rewarding a player of a game based on the ranks of other players. The method includes determining the rank of the player (or the player gaming session). The method also includes determining a set of gaming sessions in which each of these sessions has a rank that is not higher than the player's gaming session. Payouts are determined for each of these subsequent gaming sessions and a bonus is determined based on at least one of these payouts, the bonus being applied to the player gaming session. Alternatively, or in addition, a bonus is determined based on the rank of the player (or the player gaming session). The rank of the player (or the player gaming session) may increase, decrease, or remain the same, relative to the ranks of other players. The disclosed slot machine implements the method of the present invention.

In the following description, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Slot machines, including conventional reel slot machines, video poker, video keno and video blackjack machines, are generally among the most profitable casino games. Casino operators can capture the interest of slot players by offering a bonus payout in addition to a traditional payout. By determining the bonus payout based on the results of subsequent gaming sessions, casino operators can encourage slot players to increase the average duration of their sessions. Further, because the bonus payout increases the winning possibilities of players, such a bonus increases the anticipation, entertainment and excitement of a slot player.

The present invention is directed to an electronic gaming device and a method for operating an electronic gaming device to determine a bonus payout depending on the results of a gaming session begun subsequent to the start of that gaming session. The present invention maintains a database of gaming sessions and stores the results. Based upon these results, players are provided with bonuses depending on such factors as how long a particular session has been active, or how many sessions have been started subsequent to the first gaming session.

According to the present invention, a player begins a gaming session at a slot machine by entering a player identifier such as his slot club identification number. The time at which the gaming session is started is transmitted along with the player identifier to a server which stores the information. During the session, the player plays a number of games, with the gaming device generating an outcome (such as cherry-cherry-cherry) and a payout for each game.

The server tracks each gaming session and each outcome and ranks the sessions in order of time started. Alternatively, or in addition, the player and/or the game device corresponding to the gaming session may be ranked. In one embodiment, a player initiating a first gaming session is rewarded when a player from a subsequently initiated gaming session wins a jackpot of a predetermined amount. In an alternate embodiment, the player initiating a first gaming session receives a bonus which is a small fraction of the total amount of money wagered by all of those gaming session begun after his session. In both of these embodiments, the player forfeits an opportunity to receive bonus payouts when he ends his gaming session.

The preferred embodiment will be further described with reference to a client-server architecture in which game data is generated by the gaming device while much of the bonus determination processing is performed by the server. Of course, one skilled in the art will recognize various alternate embodiments that are consistent with the spirit and scope of the present invention, including without limitation performing the processing steps completely at the gaming device.

Apparatus Architecture

The apparatus architecture of an exemplary embodiment of the present invention will now be discussed with reference to FIGS. 1-3. Referring to FIG. 1, there is shown a block diagram of a gaming device network 10. Network 10 includes a gaming device server 200 (hereinafter referred to as "server") that is linked to and communicates with networked gaming devices 101, 102 and 103. Although three gaming devices are shown, a person of ordinary skill in the art will appreciate that any number of networked gaming devices could be linked to and in communication with server 200.

An architecture for a system comprising a gaming device used in conjunction with a server controller is first described, followed by a more detailed description of each of these elements. Several tables are referenced, including payout and probability tables for the gaming device and player and gaming session tables for the server. Like components in the figures are commonly represented by the same reference number which should be clear from the context of use. Further, the reference numbers generally follow a convention wherein the hundreds and thousands digits correspond to the figure number in which the reference number first appears.

As used herein, the term "gaming device" is intended to include devices such as slot machines, video poker, keno, bingo, video roulette, and video blackjack machines wherein a paid play generates a random or pseudo-random outcome used to determine a payout. Gaming device may also represent a terminal used to communicate gaming results for table game play. For example, the gaming device could be an attachment to a blackjack table operated by the dealer which communicates player identifiers and win/loss information to the central server.

Figure 2:
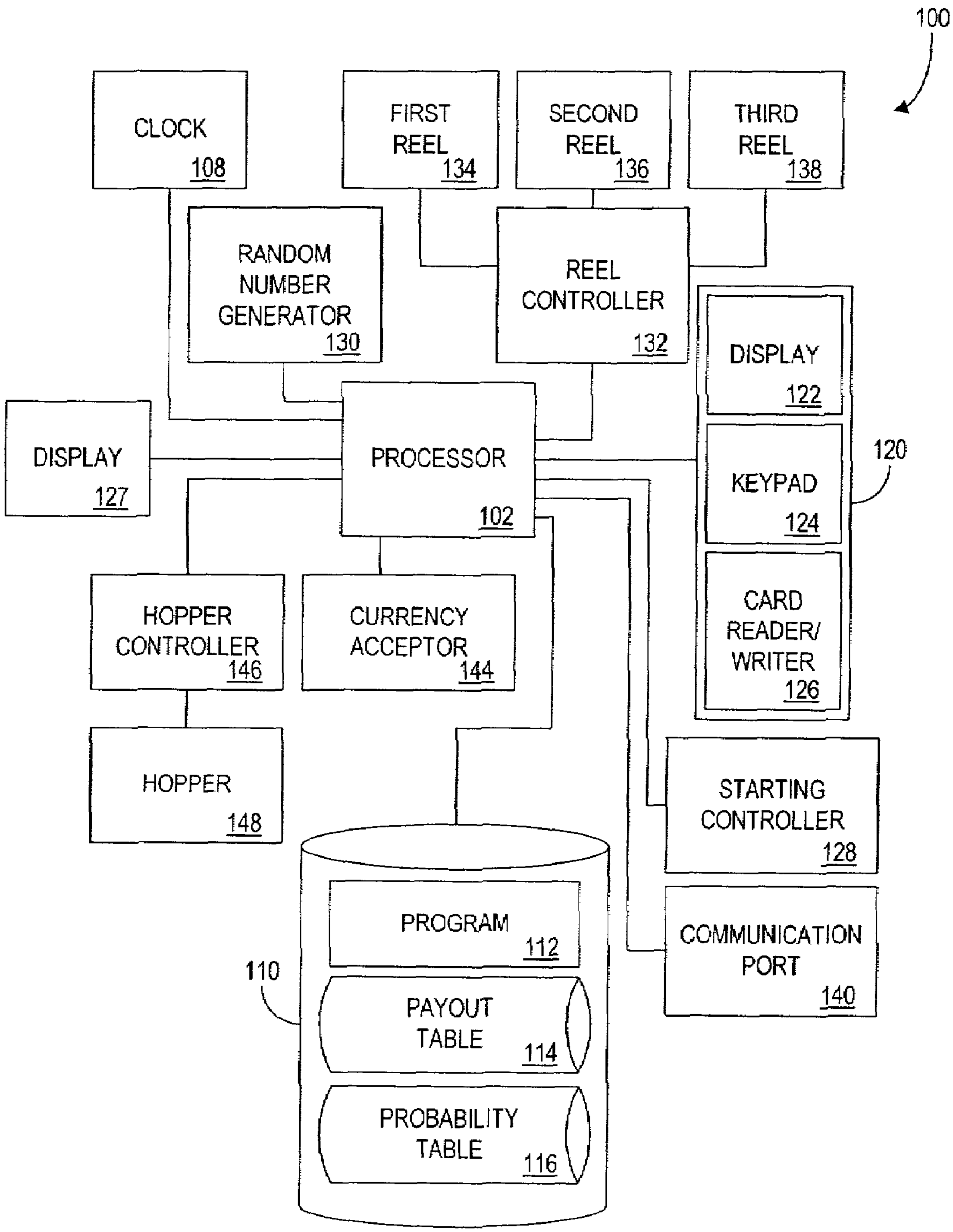
FIG. 2 is a block diagram of an electronic gaming device constructed in accordance with the present invention.

A block diagram of a gaming device indicated generally at 100 in FIG. 2 comprises a processor 102 and a data storage device 110 in communication with the processor 102. Further connected to processor 102 are: a communication port 140, a clock 108, a starting controller 128, a player interface 120, a random number generator 130, a display 127, a reel controller 132, a hopper controller 146, and a currency acceptor 144.

Referring again to processor 102, the device comprises one of many well known processing units, for example a Pentium class CPU manufactured by Intel Corporation. Data storage device 110 comprises an appropriate combination of magnetic and optical memory, such as disk drive memory, and semiconductor memory such as random access memory (RAM) and read only memory (ROM). Data storage device 110 stores control program 112, functional to operate gaming device 100 in the manner described below. Additionally stored are a payout table 114 and a probability table 116. Random number generator 130 comprises one of many well known random or pseudo-random number generators suitable for use in a gaming device. As will be further described below, during game play, data storage device 110 also stores a player credit balance and optionally an indication of the current rank of the player, the gaming session, and/or the game device, as described further below.

The rank of a player, the rank of a gaming session, and the rank of a game device are variously described and referred to herein. It will be understood that where an embodiment is described with respect to a particular type of rank, this is merely for purposes of example; embodiments are not limited to the particular type of rank stated. According to various embodiments, the ranks corresponding to a player, the player's gaming session, and the game device at which the player is playing, may be the same. For example, a reference to "the player's rank" may be the same as referring to "the rank of the gaming session" (e.g., if the player is currently playing only one gaming session).

Alternatively, the rank of a player may differ from the rank of a gaming session of the player and/or the rank of the game device. For example, a player may have a rank that corresponds to more than one gaming session (e.g., the rank is based on the player's prior and/or current gaming sessions). Similarly, a game device may have a rank that is based on more than one gaming session and/or the play of more than one player.

Currency acceptor 144 is operative to receive one or more coins or currency, and to transmit an appropriate value signal to processor 102. Hopper controller 146, and hopper 148 connected thereto, are operative under the control of processor 102 to dispense coins to a player. Reel controller 132 is operative to control the spin and outcome displayed by first, second, and third reels 134, 136, 138, respectively, which may be mechanical in nature, or graphical and displayed on display 127. Different numbers of reels may be used, or selected for use in further embodiments. In the present embodiment, gaming device 100 comprises a "twenty-two stop" machine, such that twenty-two indicia are contained on each of reels 134, 136, 138. Display 127 comprises any appropriate video display apparatus, for example, a "touch screen" that allows both input and video output, a cathode ray tube or a liquid crystal display screen. The display 127 may also comprise a projector that projects images onto a wall screen or wall display. Display 127 may be configured to scroll information across the display apparatus, or across a wall screen or wall display. Display 127 may also comprise an in-room cable system. For example, one channel of the in-room cable system of a hotel room may display a list of the top twenty-five ranked players (or gaming sessions). It is well-known in the art that a player may participate in more than one gaming session at a time (e.g., a player may be playing more than one slot machine concurrently).

To help keep player interest, various types of information about players, gaming sessions, and/or game devices could be displayed to the player via the display 127. For example, the amount of money earned, ranks of players, bonus statuses of game devices, names (or identifiers) of players (or gaming sessions), and/or the duration of gaming sessions may be displayed.

Display 127 could display information about a subset of players, gaming sessions, and/or game devices. For example, the player may be a subsequent player with respect to gaming sessions of other players (e.g., the player's gaming session started after at least one other gaming session). Display 127 could then display the ranks, bonus statuses, names, and/or identifiers of players (or gaming sessions) to whom the player (or the player's gaming session) is subsequent. In another example, display 127 could display information about the top twenty ranked players, the twenty players ranked above the player, or the twenty players ranked below the player. The player may indicate a preference for what types of information are displayed (as well as how and/or when it is displayed), and display 127 will display information in accordance with the player's preference.

The displayed information described herein may be displayed at various times. For example, information could be displayed to the player only when information is updated, only when certain information is updated, when any information is updated, when the player's rank has changed, only when the player's rank has changed, when the player's rank is likely to change, when the player is in a position to earn a bonus, or only when the player is in a position to win a bonus.

Starting controller 128 comprises a player-operated device such as a handle or button for initiating the play of a game. Player interface 120 comprises a conventional player tracking card reader 126 for receiving a player tracking card, a display 122 for communicating alpha/numeric messages to the player, and buttons and/or a keypad for receiving player input such as a player identifier.

Communication port 140 comprises a conventional network interface for connecting gaming device 100 to server 200, thereby facilitating the exchange of information such as player identifiers, gaming session start times, and gaming data between the two devices as desired.

Figure 3:
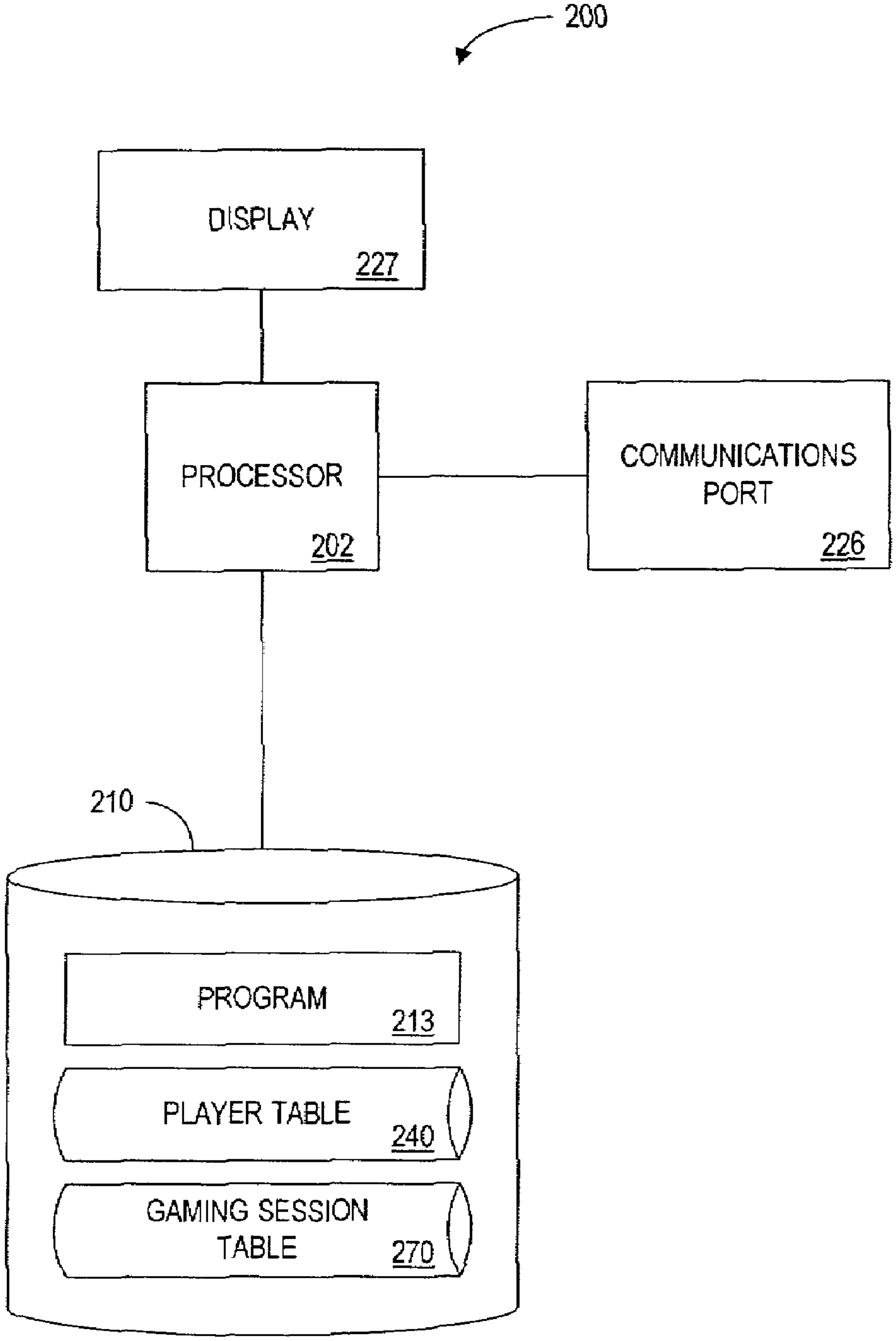
FIG. 3 is a block diagram of a slot server constructed in accordance with the present invention.

Referring now to FIG. 3, the architecture of server 200 is illustrated. In addition to conventional server components, server 200 includes a processor 202, a storage device 210, a display 227 and a communication port 226. Communication port 226 enables server 200 to communicate with gaming devices 101, 102, and 103. Storage device 210 comprises an appropriate combination of magnetic and optical memory, such as disk drive memory, and semiconductor memory such as random access memory and read only memory. Storage device 210 contains program 213, player table 240 and gaming session table 270 for controlling server 200 in accordance with the present invention. Display 227 comprises any appropriate video display apparatus, for example, a cathode ray tube or a liquid crystal display screen. Such a display is preferably viewable by patrons on the casino floor, and is used to communicate player status as described further bellow.

Data Tables

Referring now to FIG. 4, there is depicted an exemplary payout table 114. Each record of payout table 114 defines the payout awarded for each outcome, or family of outcomes, based on a single coin wagered. Payout table 114 includes outcome field 202 representing the outcome or family of outcomes associated with a particular record. Payout table 114 also includes a default payout field 204 and a bonus payout field 206. The default payout field 204 represents the amount of payout associated with conventional payouts of gaming device 100. For example, if a player wagers one coin on a play that results in an outcome of "BELL/BELL/BELL," gaming device 100 would provide a payout of twenty coins, according to default payout field 204 of record 208. Bonus payout field 206 represents additional bonus payouts earned by the player based on the performance of subsequent gaming sessions of other players. In this embodiment, the bonuses are small additions to the payout a player would normally receive for any of the top three outcomes. Referring again to record 208, the bonus payout associated with that outcome is two coins. This amount is added to the twenty coin default payout for a total combined payout amount of twenty-two coins. The amount of the bonus may be represented in alternative forms, as will be described more fully with reference to FIG. 9 below.

Referring now to FIG. 5, there is depicted a table representing the probability of specific outcomes generated by gaming device 100. Each record of probability table 116 represents an outcome or family of outcomes. Probability table 116 includes an outcome field 214 representing an outcome associated with a record. Probability table 116 further includes random number field 216 and expected hits per cycle field 218, both associated with default values.

Bonus values are associated with random number field 220 and expected hits per cycle field 222.

Random number field 216 indicates a range of numbers which, when generated by random number generator 130, result in the associated outcome. For example, random numbers "10131"-"10330" correspond to outcomes for which the last two symbols are "CHERRY," as illustrated by record 224. Outcomes of "ANY/CHERRY/CHERRY" are expected to occur two hundred times per cycle of 10,648 total plays in the cycle, as indicated by the value of "200" in expected hits per cycle field 218. The two bonus related fields indicate changes to the probability of hitting various outcomes 214 when bonuses are due to the player. In this embodiment, the probability of a losing outcome occurring is decreased while the probability of some winning outcomes is increased. Record 225, for example, indicates that the probability of hitting BELL/BELL/BELL is increased to twenty-one hits per cycle with a corresponding range of random numbers of "10617"-"10636". By increasing the winning combinations while decreasing the losing combinations, the player experiences more positive results over longer periods of time.

Referring now to FIG. 6, there is shown player table 240 of server 200. This table serves generally to store information about players, and can store information regarding bonus payouts of the present invention. Each record of player table 240 represents a unique player, although in some embodiments a single record could apply to a husband and wife playing from a single account, for example. Player table 240 includes a player identifier 242 that identifies the player. This identifier is also typically stored on the slot club card held by the player, allowing a player to identify himself by inserting the card into player tracking card reader 126, with processor 102 transmitting the identifier to server 200 which looks up the identifier in player identifier field 242.

Player table 240 also includes a name field 244, address field 246, credit card information field 248, complimentary points balance field 250, bonus account field 252, and team identifier field 254. Name field 244 and address field 246 may be used by the casino to direct promotional mailings or offers to the payer. In those embodiments in which players are paid monetary bonuses for their play, these fields may be used to send checks to the player for payments due. Credit card information field 248 may likewise be used by the casino for providing bonuses to players. Complimentary points field 250 identifies the current balance of points that the player has in his account, and may include points earned as a result of bonuses earned. For those embodiments in which players are not paid their bonuses directly through gaming device 100, a bonus account balance field 252 may be used to store an indication of how much money is owed to the player. As described more fully below, this amount may be deemed payable to the player only upon successful completion of some condition, such as winning a jackpot of at least one thousand dollars. Team identifier 254 is used in those embodiments in which team play is allowed, and provides multiple players with the option to play as a single entity. Player rank 256 may be used to indicate the rank of a player. A player rank may be, but need not be, the same as the rank of the game device at which the player is playing.

Referring now to FIG. 7, there is shown gaming session table 270 of data storage device 210 of server 200. This table serves to track the status of each gaming session initiated. Each record represents a particular gaming session, with the sessions stored in order of start time. Included in the table are current machine ranking field 272, machine identifier field 274, player identifier field 276, player start time field 278, and player stop time field 280. Current machine ranking field 272 represents the rank of each active gaming session, with a lower rank indicating that the session has been in progress for a longer duration. Those gaming sessions which have already concluded (i.e. the player stop time field 280 is populated with a stop time) are identified as "N/A" to indicate that no rank is necessary since the session has concluded. Current machine ranking field 272 is continually updated, with rankings changing as players end gaming sessions. Current machine rankings may change based on other factors, as described below. Machine identifier field 274 uniquely identifies the gaming device 100 at which the gaming session is being (or has been) played. The player identifier field 276 identifies the player of each gaming session. The value stored in the player start time field 278 indicates the time at which the gaming session was initiated, and is determined by the time at which the player inserted his player tracking card into player tracking card reader 126 of gaming device 100. Optionally, the player start time may be when the player has also completed at least one play. Player removal of the player tracking card generates a time stored in player stop time field 280. If the player gaming session is still in progress, player stop time field 280 indicates that the player is "STILL PLAYING."

Record 282, for example, shows a recently concluded gaming session. The session was played at machine "27524" by player "136243", starting at 6:38AM and ending at 7:25AM. Because the gaming session has already concluded, current machine ranking field 272 indicates a ranking of "N/A." Record 284 shows a currently active player on machine "28463" with a player identifier of "106824." The player started the session at 6:59 AM and is still playing. His current machine ranking of "3" indicates that the player gaming session is the third oldest gaming session, with only two players having longer duration of playing session. As discussed further below, current machine ranking (or game session ranking) may be determined based on factors other than the duration of the playing session. Further details of the use of gaming session table 270 are provided below.

Figure 8:
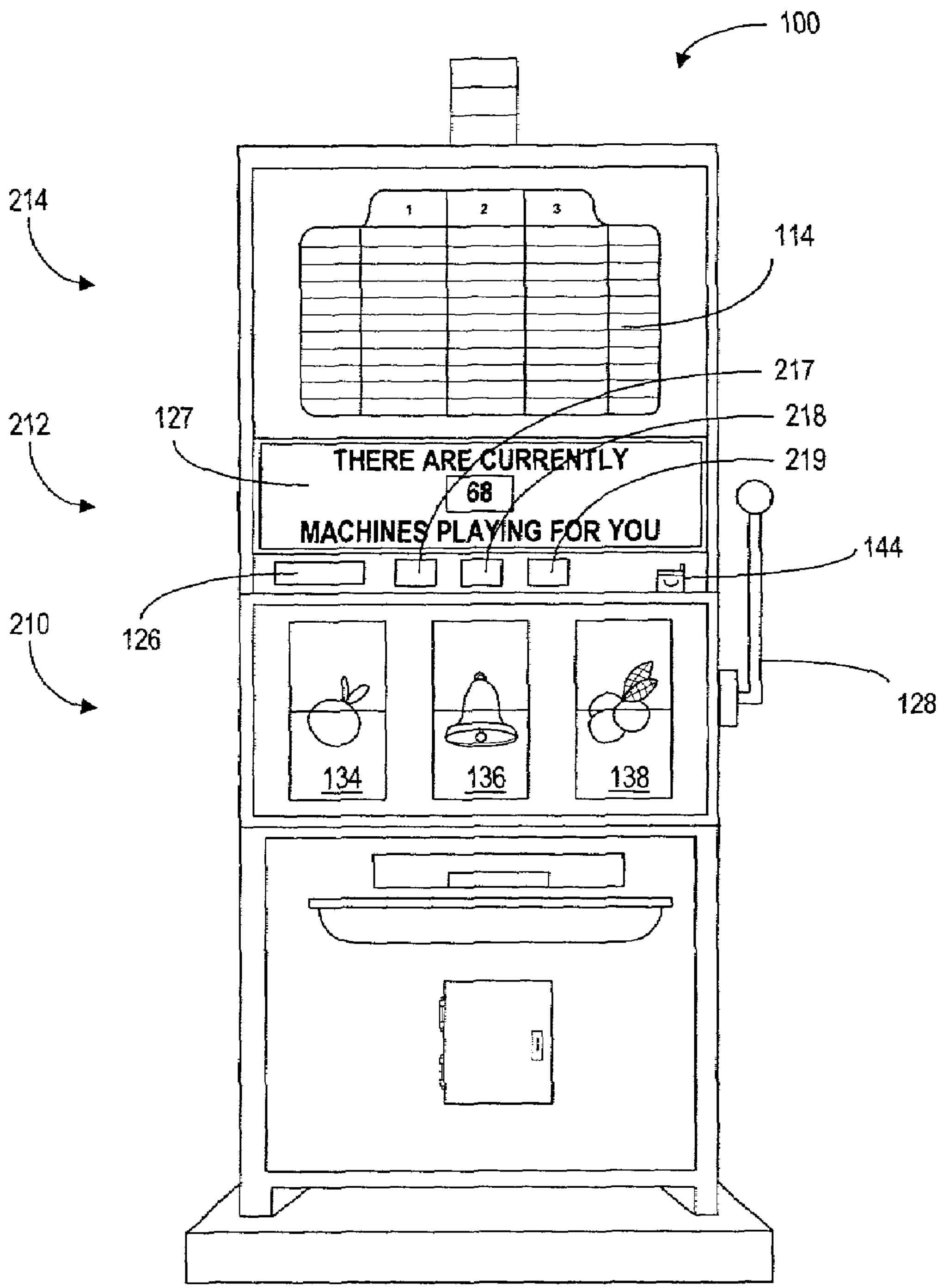
FIG. 8 is a plan view of the electronic gaming device of FIG. 2.

Referring now to FIG. 8, there is shown a front elevation view of a typical gaming device 100. It should be noted that the arrangement of player interfaces may be varied significantly and still remain within the scope of the present invention. Gaming device 100 is generally divided into three sections: a lower panel 210, a central panel 212, and an upper panel 214. Lower panel 210 provides display of a first reel 134, a second reel 136 and a third reel 138 which, as previously mentioned with respect to the reel representations in FIG. 2, can be mechanical based or electronic in nature. In this embodiment, lower panel 210 comprises a conventional electronic graphical display capable of displaying computer generated data, such as a VGA monitor or LCD display. Central panel 212 comprises a card reader 126, a currency acceptor 144, a starting controller 128, various bet buttons 217, 218 and 219, and a display 127, which provides an indication of bonus and/or ranking information to the player. The display 127 may also provide an indication of the number of subsequent gaming sessions and/or payouts resulting therefrom. The starting controller 128 may be, for example, a handle or a button. Upper panel 214 comprises a display of a payout table comprising, for example, painted 'belly' glass. In general, the payout table describes the amount paid for the reel combinations shown, based on the number of coins or credits wagered.

Description of the Operation

Figure 9A:
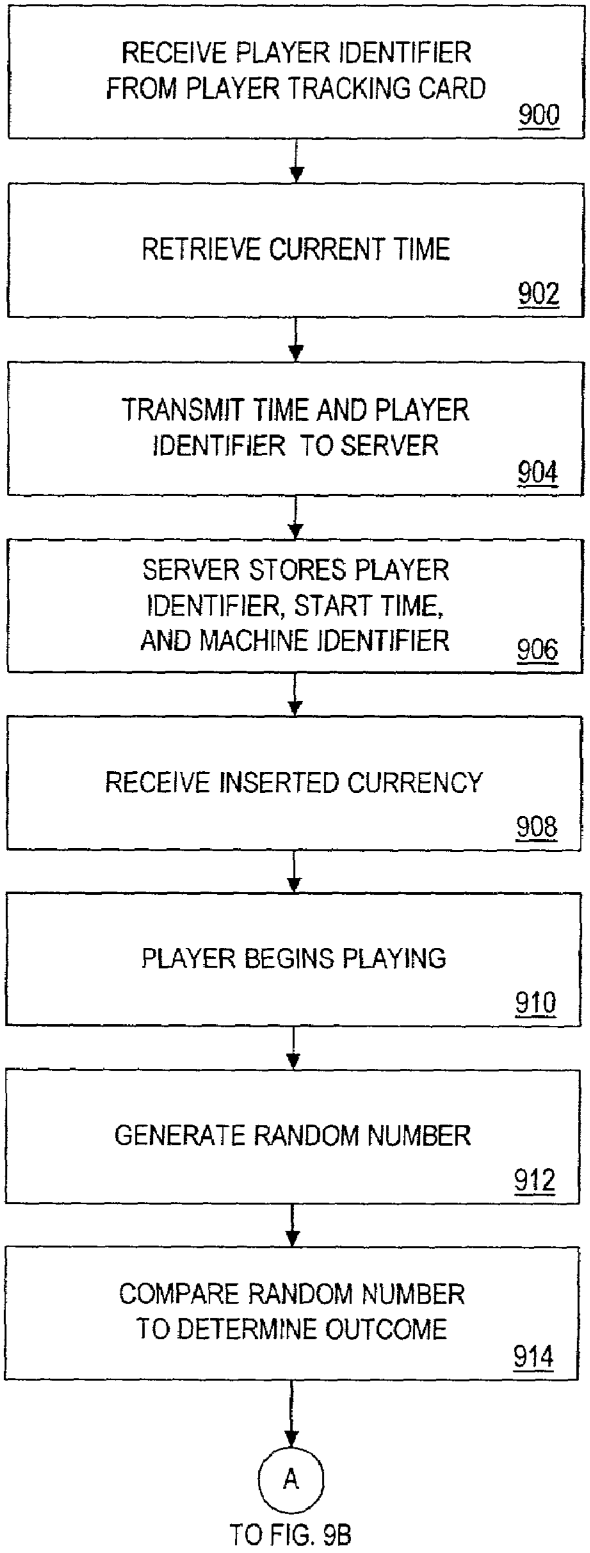
FIGS. 9A and 9B together comprise a flowchart illustrating a method for initiating play at the gaming device of FIG. 2.
Figure 9B:
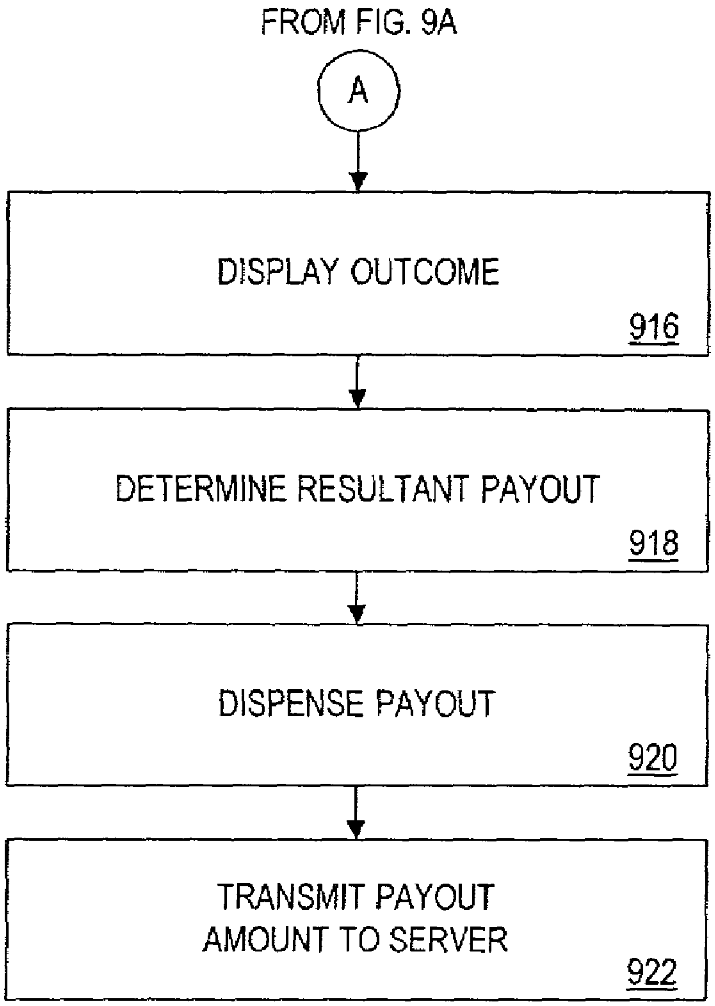

FIGS. 9A and 9B together comprise a flowchart of the process by which the player earns bonuses based on the play of subsequent gaming sessions. In one embodiment, the flowchart represents the steps carried out by processor 102 while executing program 112 (stored on data storage device 110) and processor 202 executing program 213 (stored on data storage device 210). The programs may be stored on any machine readable medium and may be downloaded from a remote device via their respective communications ports which may comprise an Ethernet card, modem or other suitable communications card or port. The game play process begins at step 900 and is represented by blocks in flowchart form. The blocks represent steps performed by software modules or objects.

The process begins when a player sits down at gaming device 100 to begin a gaming session. After inserting his player tracking card into player tracking reader 126 at step 900, the identification number is read and converted into a player identifier typically consisting of six to ten numeric digits. This data may be encoded in the card magnetically, or punched into the card so as to be optically readable. Processor 102 then retrieves the current time from clock 108 at step 902 in order to establish a start time for the gaming session. Both the time and player identifier are transmitted to server 200 via communication port 140 at step 904, initiating the gaming session of the player. Gaming device 100 also preferably includes a machine identifier with each communication with server 200 so as to allow server 200 to track the progress of each gaming session on a machine by machine basis in addition to tracking on a player by player basis as with the player identifier.

Once received by processor 202 of server 200, the player identifier, start time, and machine identifier are stored in a newly created record of gaming session table 270 at step 906. This record stays active until the player ends the gaming session as described more fully bellow.

Having initiated a gaming session by inserting his playing card (in response to which the player tracking card reader 126 generates a representative signal when the card is inserted), the player now begins play at the gaming device by entering an amount of coins or currency into currency acceptor 144 at step 908, establishing a credit balance with the device. For example, the player may deposit a twenty dollar bill and receive a corresponding twenty credits stored in data storage device 110. Once credit has been established, the player begins a play at step 910 by activating starting controller 128 such as by pulling a handle. This game initiation signal is received by processor 102, setting up a series of events associated with generating an outcome for that particular play.

First, processor 102 directs random number generator 130 to generate a random number at step 912. In the present invention, this number is an integer between “1” and “10, 648” and serves to identify a particular outcome from probability table 116. At step 914 the random number is compared with the ranges stored within the random number field 216 of probability table 116. Once the corresponding outcome is identified from outcome field 214, processor 102 directs reel controller 132 to spin reels 134, 136, and 138 so as to display the identified outcome at step 916. For example, assuming that the random number was “10,625”, the corresponding outcome is BELL/BELL/BELL. Each reel is stopped so that a bell symbol is displayed to the player. Processor 102 then searches outcome field 202 of payout table 114 in order to determine whether any payout is due to the player at step 918. In the example above, an outcome of BELL/BELL/BELL corresponds to a payout of twenty coins for each coin wagered by the player. Processor 102 then directs hopper controller 146 to dispense twenty coins from hopper 148 at step 920. The amount of any payout is transmitted to slot server 200 at step 922. In one embodiment, other data such as the outcome and the number of coins wagered is also transmitted to slot server 200.

As the player initiates further plays by entering more coins and pulling the handle of starting controller 128, server 200 tracks the results of other gaming sessions initiated at other gaming devices 100. Because each gaming session has an associated start time, server 200 is able to determine how many subsequent gaming sessions have begun from the initiation of a first gaming session. Thus, a first player initiating a gaming session at 8:00AM might have subsequent gaming sessions which started at 8:05AM by a second player at a second machine and 8:07AM by a third player at a third machine. From the perspective of the second player, the third player gaming session is also considered to be a subsequent gaming session. For each gaming session, there may in fact be a plurality of subsequent gaming sessions, forming a set of subsequent gaming sessions. Similarly, the conclusion of the gaming session of the player may be determined by receiving a signal from the player tracking card reader 126, the signal representing that the player has removed his card from the player tracking card reader 126.

The conclusion of the gaming session may be determined in other ways besides the player removing his player tracking card. For example, the server 200 could allow players to move from machine to machine, as long as the interruption was less than a predetermined period of time. Players could be tracked via their player tracking card, and the server 200 could determine the time at which a card was removed from the player tracking card reader of one machine and the time at which the card was then inserted into the player tracking card reader of another machine. If the difference in the times was less than the predetermined period of time, then the gaming session would be deemed still active, instead of concluded.

Similarly, a player may be provided with the option to keep a gaming session active (even after removing his player tracking card) provided the player initiates at least one play every month, for example. The conclusion of the gaming session would only occur if, after the player removes his player tracking card, a month (or other predetermined period of time) elapses without the player ever playing again (i.e. inserting his player tracking card) at a machine of the casino.

Figure 10:
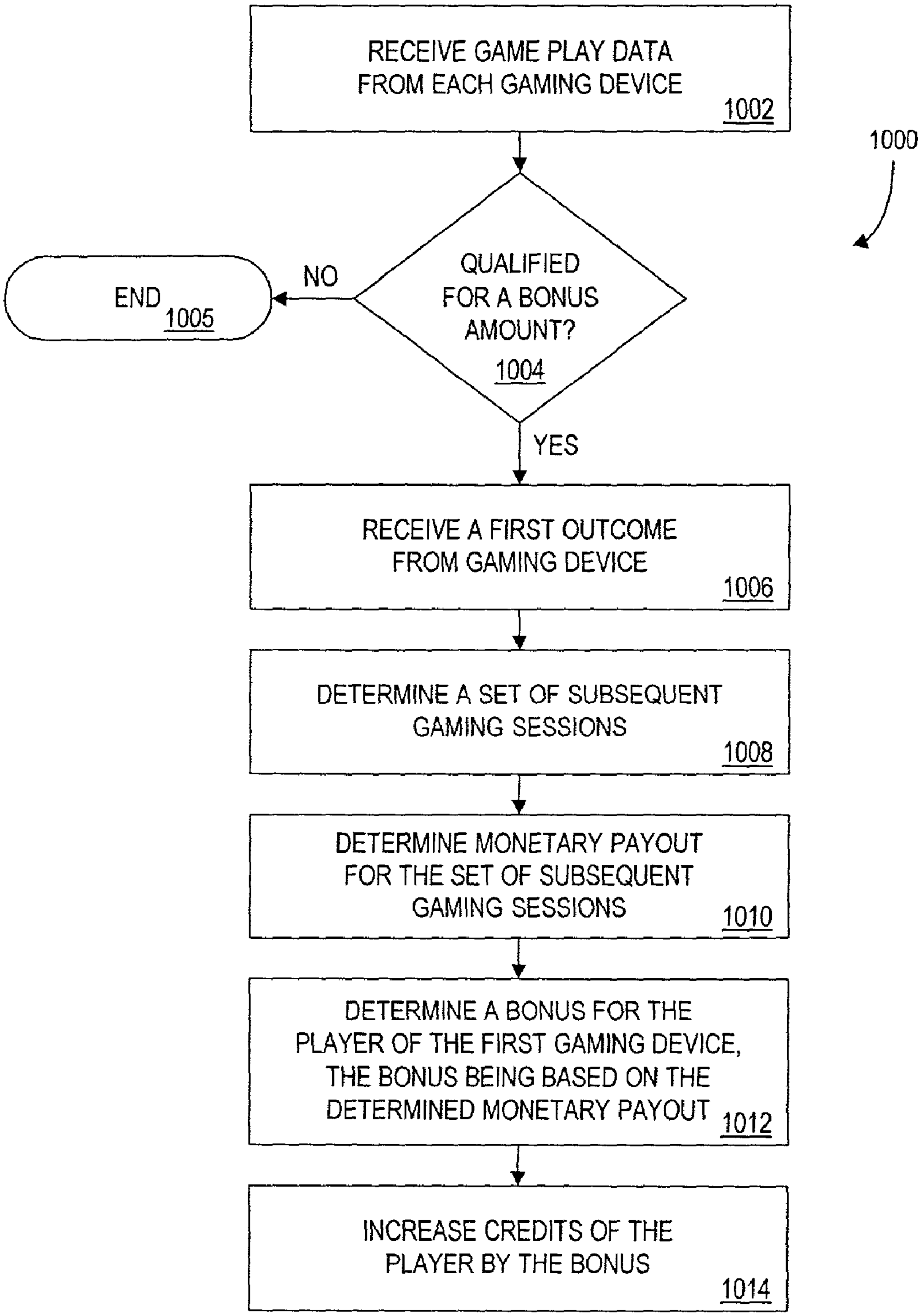
FIG. 10 is a flowchart illustrating a method for determining a bonus to be provided to a player based on the results of subsequent gaming sessions.

Referring now to FIG. 10, there is illustrated a method 1000 for determining bonuses based on the activity of subsequent gaming sessions. Generally, each player is eligible to receive bonuses based on the results of the gaming sessions initiated after that player, in much the same way that a multi-level marketing arrangement rewards participants with a commission based on sales of all subsequent sales people hired by the original participant. The more subsequent salespeople that are hired, the higher the potential commissions for the original hiring salesperson. In much the same way, the present invention encourages players to continue a given gaming session in that the longer the session continues, the more likely it is that other subsequent gaming sessions will be initiated. In one embodiment, each jackpot won by a player of a subsequent gaming session results in a bonus monetary payout for the first player, as described more fully below.

In another embodiment, the bonus comprises an increased probability of winning for one or more plays of the gaming session of the player. For example, the hit frequency of an outcome (e.g. BELL/BELL/BELL) may be increased. Those skilled in the art will understand that the hit frequency of one or more outcomes may be easily adjusted by switching among payout tables.

In still another embodiment, the bonus comprises one or more free plays ("secondary game plays") for the player. Upon receiving such a bonus, the player may initiate a play without inserting any currency and/or without having the corresponding reduction in his established credit balance.

In another embodiment, a bonus could correspond to a plurality of bonus levels. For example, a first bonus level may correspond to cash benefits, a second bonus level may provide triple comp points, a third bonus level may provide double comp points, a fourth bonus level may provide priority drink service, and fifth bonus level may indicate no bonus is yet available. A player may become eligible for a new bonus level, for example, based on the number of subsequent gaming sessions, the player's (or gaming session's) rank, the number of handle pulls, the number of handle pulls within a predetermined time period, the amount wagered, or the length of the player's gaming session. The criteria for eligibility are not limited to these examples. According to one embodiment, display 127 could display to the player an indication of the next bonus level that might be obtained if the player continues to play. For example, a player currently receiving priority drink service might be motivated to continue playing if he was informed that the next bonus level was for double comp points.

The process of determining a bonus amount begins at step 1002 of FIG. 10 with server 200 receiving game play data from each gaming device 100. Processor 202 determines whether the game play data qualifies for a bonus amount at step 1004. For example, a rule stored in program 213 might hold that all jackpots of more than five thousand dollars enable eligible players to receive a bonus. The bonus may be a flat monetary amount per jackpot, or a percentage of the jackpot. If the processor 202 determines that the game play data qualifies for a bonus amount, the process 1000 continues to step 1006. If the processor 202 determines that the game play data does not qualify for a bonus amount, the process 1000 ends (step 1005).

At step 1006, processor 202 receives an outcome from a first gaming device. The outcome indicates a play at the first gaming device, and in turn directs processor 202 to initiate a function which determines a set of subsequent gaming sessions (step 1008). Alternatively, the function may be initiated without receiving the outcome for the first gaming device. For example, the processor 202 may initiate the function periodically, at a predetermined time, or for each gaming session eligible for a bonus. The subsequent gaming sessions are identified and stored in temporary memory while processor 202 determines a monetary payout entitled to one or more of the set of subsequent gaming sessions (step 1010). Based on the determined monetary payout, a bonus is calculated for the player of the first gaming device (step 1012), and credited to the machine that he is currently playing (step 1014). In one embodiment, the bonus may be credited to other accounts, such as a player "comp" account that stores casino reward points, a financial account, etc. In another embodiment, the bonus is proportional to the sum of the payouts of all subsequent gaming sessions (e.g., the bonus is a percentage of all payouts of all subsequent gaming sessions). In still another embodiment, rather than immediately crediting an account or the machine, the player might accumulate value in an account which is "unlocked" when he hits a jackpot within the gaming session.

In one embodiment, the bonus is not awarded unless the player satisfies one or more conditions which may be established by the casino. For example, the player may be required to have one or more plays in which a predetermined outcome is achieved (e.g., BELL/BELL/BELL), and/or may be required to achieve a predetermined outcome within a predetermined time (e.g., BELL/BELL/BELL once every hour). The player may be required to sustain at least a predetermined rate of play (e.g. a predetermined number of handle pulls or coins deposited per unit of time). The rate of play may be easily determined by the processor 102 and transmitted to the server 200, as would be apparent to those skilled in the art.

Alternatively, or in addition, the rank of a player may be determined. The rank may be based on the number of subsequent gaming sessions. For example, the rank of the player may be based on the number of other players that initiated gaming sessions after the player initiated his gaming sessions. According to this example, the player whose gaming session has the greatest number of subsequent gaming sessions would have the highest rank. Similarly, the rank may be based on the number of subsequent gaming sessions that are currently not yet concluded. For example, the rank of the player may be based on the number of players that both initiated gaming sessions after the player initiated his gaming session and are still playing.

Alternatively, the rank may be based on the number of prior gaming sessions. For example, the rank of the player may be based on the number of other players that initiated gaming sessions before the player initiated his gaming session. According to this example, a player who initiated his gaming session after those of four other players would have a rank of "5", and the four other players would be ranked "1", "2", "3", and "4". Similarly, the rank may be based on the number of prior gaming sessions that are currently not yet concluded. For example, the rank of the player may be based on the number of players that both initiated gaming sessions before the player initiated his gaming session and are still playing. Various embodiments of the present invention provide for where the rank of the player may fluctuate as other players initiate and conclude gaming sessions, and/or as the ranks of other players increase or decrease.

In still another embodiment, the rank may be based on the start of the player's gaming session. For example, players that start during a predetermined time period (e.g. between 3:00 AM and 4:00 AM) could be afforded a higher rank than other players. In still another embodiment, the rank may be based on the duration of the gaming session. For example, the longer the gaming session, the higher the rank. Accordingly, players would have an incentive to play longer. In another embodiment, the rank may be based on the number of handle pulls and/or the number of coins wagered by the player during the gaming session. Accordingly, players would have an incentive to wager more and/or to play faster.

In addition, there are a number of ways in which the player could increase his rank relative to other players. For example, the player could spend more time at the gaming device, play faster at the gaming device, be a member of the slot club, be a premium slot player, have a higher dollar volume of play, and/or initiate a session during off-peak hours. Alternatively, or in addition, a win, a predetermined outcome (e.g., CHERRY/CHERRY/CHERRY), or a predetermined series of outcomes (e.g., five winning outcomes in a row paying three coins or more, or completing a one card flush draw five times in a predetermined period), may increase the player's rank (e.g., increase the player's rank by five positions, increase the player's rank to a predetermined or randomly determined rank). Alternatively, or in addition, the player could obtain a higher rank in exchange for all or a portion of his winnings, for providing an additional amount of funds, for agreeing to listen to a marketing pitch, or for accepting a marketing offer (e.g., agreeing to switch long distance providers, applying for a credit card). For example, the player may pay an amount in exchange for a rank, a guaranteed minimum rank, or an increase in rank (e.g., pay five dollars in exchange for a rank of 10, pay ten dollars in exchange for a guaranteed minimum rank of 15). A player could also be offered the opportunity to "buy" a rank of another player.

There are various similar ways in which the player could decrease his rank relative to other players. For example, a win, a predetermined outcome (e.g., CHERRY/CHERRY/CHERRY), or a predetermined series of outcomes (e.g., five winning outcomes in a row paying three coins or more, completing a one card flush draw five times in a predetermined period), may decrease the player's rank. Also, the appearance of special reel symbols could decrease the player's rank. Alternatively, or in addition, the player could agree to a lower rank, or to be limited to a maximum rank, and could receive additional credits or other amount of funds in exchange.

The factors described herein with respect to increasing or decreasing a player's rank could be used to determine whether the player is to be given a particular rank. For example, obtaining CHERRY/CHERRY/CHERRY gives the player the number five ranking. It should further be understood that a rank need not be unique; more than one player may have the same rank.

Bonuses may be determined based on the activity of lower-ranked gaming sessions, or, alternatively, the activity of gaming sessions that are not ranked higher than the player's gaming session. For example, each player may be eligible to receive bonuses based on the results of the gaming sessions ranked lower than the gaming session of the player, in a manner similar to that described above with respect to bonuses based on the activity of subsequent gaming sessions. For example, each jackpot won by a player of a gaming session that is not ranked higher than the gaming session of a first player results in a bonus payout for the first player. Alternatively, or in addition, embodiments of the present invention provide for determining bonuses based on the activity of gaming sessions that have a higher rank.

Alternatively, or in addition, the bonus may be determined based on the rank. The bonus may correspond to a particular rank (e.g., rank "3"), a set of ranks (e.g., the gaming sessions ranked "1", "11" and "21"), or a range of ranks (e.g., gaming sessions ranked 5-10). For example, all players in the top ten rank positions may receive a bonus of a free drink. In another example, the player(s) in the seventh rank position may receive a bonus based on the activity of the highest-ranked gaming session.

A player's rank may also correspond to a particular bonus level. For example, players ranked first through tenth may be at a gold bonus level, a player ranked eleventh may be at a silver bonus level, and players ranked 12-50 may be at a bronze bonus level. The bonus may be thus be determined based on the bonus level, as described further above.

Figure 11:
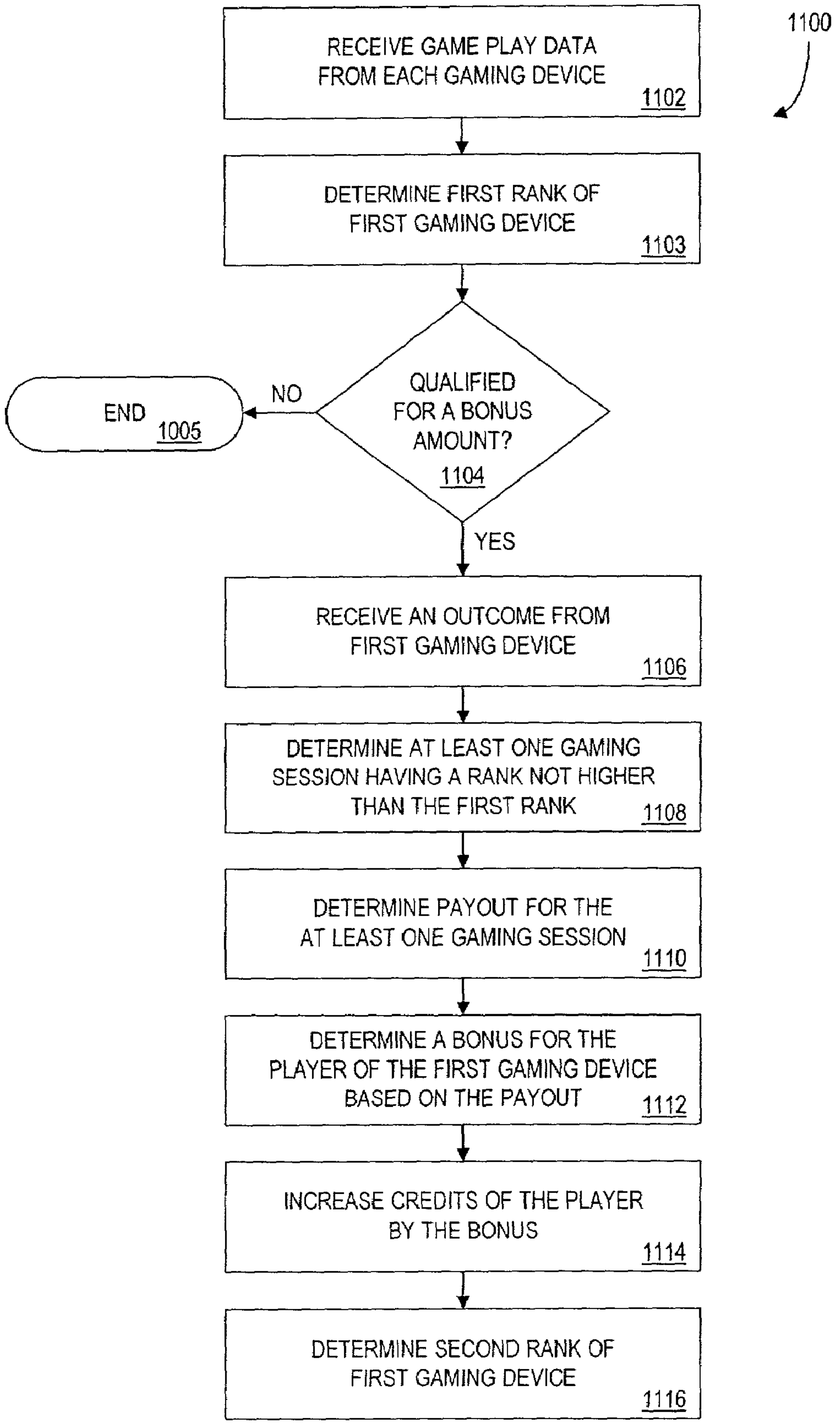
FIG. 11 is a flowchart illustrating a method for determining a bonus to be provided to a player based on the results of at least one gaming session having a rank that is not higher than the rank of the player.

FIG. 11 depicts a process 1100 for determining a bonus amount. At step 1102, server 200 receives game play data from each gaming device 100. At step 1103, processor 202 determines the rank of each gaming device 100. As described above, the rank may be determined based on various factors. Alternatively, or in addition, an indication of a rank may be retrieved from a database, such as player table 240 or gaming session table 270. Processor 202 may store an indication of the determined rank in a database, such as player table 240 or gaming session table 270.

Processor 202 determines whether the game play data for a game device (or gaming session or player) qualifies for a bonus amount at step 1104. For example, a rule stored in program 213 might hold that all jackpots of more than five thousand dollars enable eligible players to receive a bonus. Alternatively, or in addition, eligibility for a bonus may be based on rank. For example, a rule stored in program 213 might hold that a player with a rank higher than or equal to "25" is eligible to receive a bonus. The bonus may be a flat monetary amount per jackpot, a percentage of the jackpot, and/or may be dependent on the player's rank. If the processor 202 determines that the game play data qualifies for a bonus amount, the process 1100 continues to step 1106. If the processor 202 determines that the game play data does not qualify for a bonus amount, the process 1100 ends (step 1105).

At step 1106, processor 202 preferably receives an outcome from a first gaming device. The outcome indicates a play at the first gaming device, and in turn directs processor 202 to initiate a function which determines at least one gaming session having a rank that is not higher than the rank of the first gaming device (step 1108). Alternatively, step 1106 does not occur, and the function may be initiated without receiving the outcome for the first gaming device. For example, the processor 202 may initiate the function periodically, at a predetermined time, or for each eligible gaming session after determining the gaming sessions eligible for a bonus. The at least one gaming session is identified and stored in memory while processor 202 determines a payout (e.g., a monetary payout) entitled to the at least one gaming session (step 1110). A bonus is calculated for the player of the first gaming device based on the determined payout (step 1112), and credited to the machine (or gaming session) that he is currently playing (step 1114).

Alternatively, the bonus may be calculated based on the payout, the outcome from the first gaming device, the game play data of the first gaming device, the game play data of the at least one gaming session, the rank of the first gaming device, or any combination thereof. In one embodiment, the bonus may be credited to other accounts, such as a player "comp" account that stores casino reward points, a financial account, etc. In another embodiment, the bonus is proportional to the sum of the payouts of all lower-ranked gaming sessions (e.g., the bonus is a percentage of all payouts of all lower-ranked gaming sessions). In still another embodiment, rather than immediately crediting an account or the machine, the player might accumulate value in an account which is "unlocked" when he hits a jackpot within the gaming session.

A second rank of the first gaming device may be determined (step 1116) as described in detail above. Of course, it is possible that the second rank is the same as the first rank.

It is to be understood that the above embodiment descriptions are intended to be illustrative, and not restrictive. Many other embodiments will be apparent to those of skill in the art upon reviewing the above description. For example:

The bonus amount could be pari-mutuel in nature. For example, 10% of each jackpot amount could be added to the bonus pool and apportioned to all active gambling sessions started before the session that wins the jackpot. The apportionment could be even, or skewed towards the longer sessions or skewed based on the ranks of the players.

The player could receive benefits after the conclusion of his gaming session, perhaps for a predetermined period of time. Alternatively, the player might have the ability to take a break for a predetermined period of time, maintaining his position or losing only a part of his position. (The machine could allow unattended play as well.) The player might be provided the ability to take a break, for example, after achieving a win, a predetermined outcome, or a predetermined series of outcomes. The player might also be able to pay money to keep his position maintained. Faster play could also build-up an "account" which the player used at a later time. For example, playing the machine at a predetermined rate or number of handle pulls per hour could earn the player a break. Alternatively, or in addition, the player could be provided a break after a predetermined number of handle pulls, or after a predetermined amount wagered. The player could also pay to build up an account. Alternatively, the player could be comped to a break by the casino.

Players could form teams, with individual players playing in "shifts" for the team. As long as one or more of the team members were active, the team would retain its position. In this way, sessions are effectively linked together. For example, a gaming session would be initiated when any team member initiated a gaming session. The gaming session would only conclude when no other members of the team are playing. Alternatively, or in addition, two individual players, such as a husband and wife, may be playing from a single account. As long as one spouse was playing, the position of the session associated with the account could be maintained.

Although the above description has used a slot machine embodiment by way of example, the present invention is equally applicable to other games such as video poker. In such an embodiment, the bonus could be card-based. For example, a bonus may be that the player gets a second chance drawing or is able to replace one or more of his drawn cards with a new card. Similarly, the bonus could comprise adding one or more aces (or another card) to the standard fifty-two card deck in order to provide the player with a higher probability of winning.

Similarly, the present invention could also be applied to table games such as blackjack, craps, or roulette. In such an embodiment, a player would initiate a gaming session by handing the dealer his player tracking card, and conclude the session by requesting the return of the player tracking card. The server which tracks the player's casino reward points may then operate as the server 200 described above to award bonuses as appropriate.

The invention could apply across different games, with subsequent gaming sessions including, for example, blackjack, craps, and slots. For example, the player could remove his player tracking card from a slot machine, then hand it to a dealer at a blackjack table within a predetermined amount of time to continue his gaming session that was initiated at the slot machine.

What is claimed is:

1. A method comprising:

determining a first gaming session;

determining a rank for each of a plurality of gaming sessions comprising the first gaming session and at least one other gaming session, each at least one other gaming session having a respective rank that is not higher than the rank of the first gaming session;

determining data corresponding to the at least one other gaming session;

determining at least one bonus based on the data; and applying the at least one bonus to the first gaming session, in which determining the rank of each of the plurality of gaming sessions comprises:

determining for each of the plurality of gaming sessions a number of prior gaming sessions that are not concluded; and determining the rank of each of the plurality of gaming sessions based on the number.

2. A method comprising:

determining a first gaming session;

determining a rank for each of a plurality of gaming sessions comprising the first gaming session and at least one other gaming session, each at least one other gaming session having a respective rank that is not higher than the rank of the first gaming session;

determining data corresponding to the at least one other gaming session;

determining at least one bonus based on the data; and applying the at least one bonus to the first gaming session, in which determining the rank of each of the plurality of gaming sessions comprises:

determining for each of the plurality of gaming sessions a number of subsequent gaming sessions that are not concluded; and determining the rank of each of the plurality of gaming sessions based on the number.

3. A method comprising:

determining a first gaming session;

determining a rank for each of a plurality of gaming sessions comprising the first gaming session and at least one other gaming session, each at least one other gaming session having a respective rank that is not higher than the rank of the first gaming session;

determining data corresponding to the at least one other gaming session;

determining at least one bonus based on the data; and applying the at least one bonus to the first gaming session, in which determining the rank of each of the plurality of gaming sessions comprises:

determining for each of the plurality of gaming sessions a start time; and determining the rank of each of the plurality of gaming sessions based on the start time.

4. A method comprising:

determining a first gaming session;

determining a rank for each of a plurality of gaming sessions comprising the first gaming session and at least one other gaming session, each at least one other gaming session having a respective rank that is not higher than the rank of the first gaming session;

determining data corresponding to the at least one other gaming session;

determining at least one bonus based on the data; and applying the at least one bonus to the first gaming session, in which determining the rank of each of the plurality of gaming sessions comprises:

determining for each of the plurality of gaming sessions a duration; and determining the rank of each of the plurality of gaming sessions based on the duration.

5. A method comprising:

determining a first gaming session;

determining a rank for each of a plurality of gaming sessions comprising the first gaming session and at least one other gaming session, each at least one other gaming session having a respective rank that is not higher than the rank of the first gaming session;

determining data corresponding to the at least one other gaming session;
determining at least one bonus based on the data; and
applying the at least one bonus to the first gaming session,
in which determining the rank of the first gaming session comprises:
providing an offer to assign the rank to the first gaming session in exchange for an amount of funds.

6. A method comprising:
determining a first gaming session;
determining a rank for each of a plurality of gaming sessions comprising the first gaming session and at least one other gaming session, each at least one other gaming session having a respective rank that is not higher than the rank of the first gaming session;
determining data corresponding to the at least one other gaming session;
determining at least one bonus based on the data; and
applying the at least one bonus to the first gaming session,
in which determining the rank of each of the plurality of gaming sessions comprises:
determining for each of the plurality of gaming sessions a rate of play; and
determining the rank of each of the plurality of gaming sessions based on the rate of play.

7. The method of claim 6, in which determining the data comprises:
determining at least one outcome corresponding to the at least one other gaming session.

8. The method of claim 6, in which determining the data comprises:
determining at least one payout corresponding to the at least one other gaming session.

9. The method of claim 6, in which the at least one bonus comprises an increased probability of winning for at least one play of the first gaming session.

10. The method of claim 6, in which the at least one bonus comprises a payout.

11. The method of claim 10, in which applying comprises:
dispensing an amount of coins.

12. The method of claim 6, in which the at least one bonus comprises a secondary game play.

13. The method of claim 6, in which applying comprises:
determining an account associated with the first gaming session; and
applying the at least one bonus to the account.

14. The method of claim 6, further comprising:
determining a second gaming session of a second player; and
displaying an indication of the second gaming session of the second player to a first player,
in which the first player is associated with the first gaming session.

15. The method of claim 14, in which displaying an indication comprises:
determining a rank of the second gaming session based on a rate of play of the second gaming session; and
displaying an indication of the rank of the second gaming session to the first player.

16. The method of claim 14, in which determining the second gaming session comprises:
determining the second gaming session of the second player, the second gaming session having a rank that is not lower than a predetermined rank.

17. The method of claim 6, in which the rate of play is based on an aggregate amount wagered in the first gaming session.

18. The method of claim 6, in which the rate of play is based on how many game plays have been conducted in the first gaming session.

19. The method of claim 6, in which the rate of play is based on a determined number of game plays per unit time.

20. The method of claim 6, in which the rate of play is based on a determined amount wagered per unit time.

21. The method of claim 6, further comprising:
determining a rank of a player associated with the first gaming session, in which the rank of the player is different than the rank of the first gaming session.

22. The method of claim 6, further comprising:
determining a rank of a gaming device associated with the first gaming session, in which the rank of the gaming device is different than the rank of the first gaming session.

23. A computer readable medium storing instructions configured to direct a processor to perform the method of claim 6.

24. An apparatus comprising:
a processor; and
the computer readable medium of claim 23 in communication with the processor.

25. A method comprising:
determining a first gaming session;
determining a rank of the first gaming session based on at least one of the following:
a measure of wagering in the first gaming session,
a number of prior gaming sessions of at least one other player, and
a number of subsequent gaming sessions of at least one other player;
determining at least one other gaming session, each at least one other gaming session having a respective rank that is different than the rank of the first gaming session;
determining data corresponding to the at least one other gaming session;
determining at least one bonus based on the data;
applying the at least one bonus to the first gaming session; and
displaying information corresponding to a plurality of gaming sessions, including the first gaming session.

26. The method of claim 25, in which displaying comprises:
displaying the information via a wall display.

27. The method of claim 25, in which displaying comprises:
displaying the information via a cable system.

28. The method of claim 25, in which displaying comprises:
displaying respective ranks of the plurality of gaming sessions.

29. The method of claim 25, in which displaying comprises:
displaying respective bonus statuses of a plurality of gaming devices.

30. The method of claim 25, in which displaying comprises:
displaying information about respective players for the plurality of gaming sessions.

31. The method of claim 25, in which displaying comprises:
displaying an indication of at least one gaming session initiated subsequent to the first gaming session.

32. The method of claim 25, in which displaying comprises:

displaying an indication of at least one gaming session initiated prior to the first gaming session.

33. The method of claim 25, in which displaying comprises:

displaying an indication of only gaming sessions having respective ranks that are not higher than the rank of the first gaming session.

34. The method of claim 25, in which displaying comprises:

displaying an indication of only gaming sessions having respective ranks that are not less than the rank of the first gaming session.

35. The method of claim 25, in which displaying comprises:

displaying the information when at least a portion of the information changes.

36. The method of claim 25, in which displaying comprises:

displaying the information when the rank of the first gaming session changes.

37. The method of claim 25, in which displaying comprises:

displaying the information when the rank of the first gaming session is likely to change.

38. The method of claim 25, in which displaying comprises:

displaying the information when the first gaming session is eligible for a bonus.

39. The method of claim 25, in which displaying comprises:

displaying an indication of a bonus level potentially achievable for the first gaming session if the first gaming session continues.

40. The method of claim 25, in which displaying comprises:

determining a player preference for what types of information are displayed; and displaying the information in accordance with the player preference.

41. The method of claim 25, in which the measure of wagering comprises an aggregate amount wagered in the first gaming session.

42. The method of claim 25, in which the measure of wagering comprises how many game plays have been conducted in the first gaming session.

43. The method of claim 25, in which the measure of wagering comprises a determined number of game plays per unit time.

44. The method of claim 25, in which the measure of wagering comprises a determined amount wagered per time.

45. A computer readable medium storing instructions configured to direct a processor to perform the method of claim 25.

46. An apparatus comprising:

a processor; and the computer readable medium of claim 45 in communication with the processor.

* * * * *